United States Patent
Lortz et al.

(10) Patent No.: US 9,418,352 B2
(45) Date of Patent: Aug. 16, 2016

(54) IMAGE-AUGMENTED INVENTORY MANAGEMENT AND WAYFINDING

(75) Inventors: Victor B. Lortz, Beaverton, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/537,234

(22) Filed: Jun. 29, 2012

(65) Prior Publication Data

US 2014/0003727 A1    Jan. 2, 2014

(51) Int. Cl.
| | |
|---|---|
| *G06K 9/68* | (2006.01) |
| *G06Q 10/08* | (2012.01) |
| *G06Q 30/06* | (2012.01) |
| *G06F 17/30* | (2006.01) |

(52) U.S. Cl.
CPC ........ *G06Q 10/087* (2013.01); *G06F 17/30244* (2013.01); *G06Q 30/0633* (2013.01)

(58) Field of Classification Search
CPC ........ G06Q 10/087; G06Q 10/08; G06K 9/68
USPC ................. 382/218, 321; 705/26.64
See application file for complete search history.

(56) References Cited

U.S. PATENT DOCUMENTS

| | | | |
|---|---|---|---|
| 8,065,353 B2 | 11/2011 | Eckhoff-Hornback et al. | |
| 8,255,291 B1 * | 8/2012 | Nair | ............................ 705/26.64 |
| 2005/0137943 A1 | 6/2005 | Holzman | |
| 2006/0095346 A1 * | 5/2006 | Gambhir | .............. G06Q 10/087 705/28 |
| 2007/0061895 A1 * | 3/2007 | Ceraolo et al. | .................. 726/28 |
| 2007/0284442 A1 * | 12/2007 | Herskovitz | ............. G06Q 20/18 235/383 |
| 2008/0077511 A1 | 3/2008 | Zimmerman | |
| 2009/0121017 A1 | 5/2009 | Cato et al. | |
| 2009/0192921 A1 | 7/2009 | Hicks | |
| 2009/0265251 A1 * | 10/2009 | Dunlap | ............... G06Q 10/087 705/26.1 |
| 2010/0042469 A1 * | 2/2010 | Chandrasekar et al. | ........ 705/10 |
| 2010/0070365 A1 | 3/2010 | Siotia et al. | |
| 2010/0076867 A1 * | 3/2010 | Inoue et al. | ..................... 705/27 |
| 2012/0037700 A1 | 2/2012 | Walji et al. | |
| 2012/0123674 A1 * | 5/2012 | Perks et al. | ................... 701/426 |
| 2012/0158482 A1 * | 6/2012 | Paradise et al. | ............ 705/14.25 |
| 2012/0259744 A1 * | 10/2012 | Ganesh | .................. G06Q 30/00 705/27.2 |

(Continued)

FOREIGN PATENT DOCUMENTS

| | | |
|---|---|---|
| EP | 1598763 A1 | 11/2005 |
| JP | 2007-316897 A | 12/2007 |
| KR | 10-2004-0042008 A | 5/2004 |

(Continued)

OTHER PUBLICATIONS

International Search Report and Written Opinion received for Patent Application No. PCT/US2013/047708, mailed on Sep. 26, 2013, 12 pages.

(Continued)

*Primary Examiner* — Gregory M Desire
(74) *Attorney, Agent, or Firm* — Jordan IP Law, LLC (57) ABSTRACT

Systems and methods may provide for receiving a query regarding an establishment, retrieving an output image from an image database in response to the query, and transmitting the output image to a mobile device. In one example, image data including a plurality of interior establishment images and a plurality of stocking area images are also received, wherein the image database may be constructed based on the received image data.

4 Claims, 4 Drawing Sheets

(56) References Cited

U.S. PATENT DOCUMENTS

2013/0144691 A1* 6/2013 Mehta et al. .................. 705/14.4
2014/0003655 A1* 1/2014 Gopalakrishnan ... G06Q 10/087
　　　　　　　　　　　　　　　　　　　　　　　　382/103
2014/0003727 A1* 1/2014 Lortz et al. .................... 382/218
2014/0006195 A1* 1/2014 Wilson ............................ 705/21

FOREIGN PATENT DOCUMENTS

WO　　2007/117368 A2　　10/2007

OTHER PUBLICATIONS

European Search Report for EP Patent Application No. 13809548.4, mailed Jan. 13, 2016, 9 pages.

* cited by examiner

IMAGE-AUGMENTED INVENTORY MANAGEMENT AND WAYFINDING

BACKGROUND

Embodiments generally relate to inventory management. More particularly, embodiments relate to the use of images to augment inventory management systems.

Retail establishment (e.g., store) management may be complex, depending upon the size of the establishment. For example, locating particular products in a large retail establishment may be a challenge to customers as well as employees, particularly as product locations change and individuals' memories fade. Indeed, time consuming product searches may negatively impact the shopping experience from the customer's perspective, and may increase labor costs with regard to tracking inventory, stocking items and assisting customers, from the retailer's perspective.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
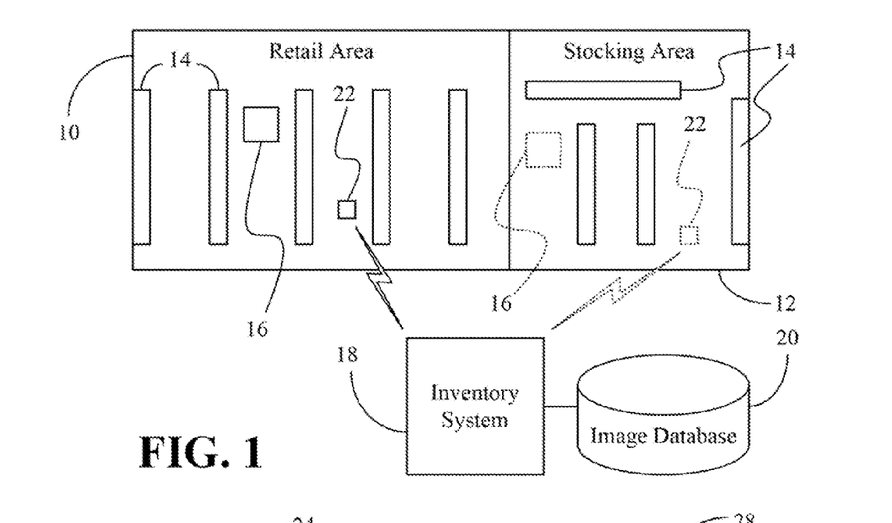
FIG. 1 is a block diagram of an example of a retail establishment according to an embodiment.

Turning now to FIG. 1, a retail establishment/store is shown in which a retail area 10 and an associated stocking area 12 contain shelves 14 with products for sale to consumers. The retail establishment may therefore correspond to a "big box" store, grocery store, etc., wherein both customers and employees may frequently find themselves in search of particular products or types of products. In some examples, the establishment may not have the stocking area 12. In the illustrated example, one or more surveying mobile devices/platforms 16 pass through the aisles between the shelves 14 and capture high resolution images of the products and associated barcodes (e.g., universal product codes/UPCs) on the shelves 14. These interior establishment images may be transmitted to an inventory system 18, which uses the interior establishment images provided by the surveying mobile platforms 16 to construct an image database 20, in the example shown. The surveying mobile platforms 16 may have a shopping cart form factor and may be equipped to measure wheel movement in order to collect distance information and determine the location of the platform in the establishment. Even if physical dimensions are not measured by the surveying mobile platforms 16, equipment operators could manually provide reference information such as an aisle number during or after scanning, wherein the reference information may enable the inventory system 18 to map the captured images onto an establishment floor layout diagram.

The surveying mobile platforms 16 may include computing functionality (e.g., multi-core processor), a high resolution camera, onboard lights (e.g., to improve image quality and barcode illumination), and onboard disk storage. Once the physical establishment has been captured and recorded onto the storage of the surveying mobile platforms 16, the equipment operators may connect the mobile platforms 16 to a high speed network and transfer the image data to the inventory system 18. The inventory system 18 may analyze the image data to identify products based on recognized object shapes, barcodes, text, logos, etc., in order to construct the image database 20. As will be discussed in greater detail, the image database 20 that is constructed from the image data may be searchable by image, product identifier, aisle identifier, shelf identifier, and so forth, in real-time.

The illustrated retail establishment also includes one or more handheld mobile devices 22 configured to issue queries regarding the retail establishment in response to user input. The handheld mobile devices 22 may be carried and operated by employees (camera equipped inventory scanner) and/or customers (e.g., camera equipped smart phone, smart tablet). For example, an employee may encounter an empty shelf location and use the mobile device 22 to capture an image of the empty shelf location and/or a corresponding shelf-mounted barcode, wherein the image is transmitted wirelessly to the inventory system 18 in the form of a query. Upon receipt of the query, the inventory system 18 may analyze the image to identify nearby product shapes, barcodes, text, logos, etc. and determine the identity of the product in question. The inventory system 18 may also use other information provided with the query to complete the product identification. In such a scenario, the inventory system 18 may use the image database 20 to determine whether the product is shelved in the stocking area 12. If so, the illustrated inventory system 18 returns an image of the product location in the stocking area 12 to the handheld mobile device 22, along with additional information such as an aisle identifier, shelf identifier, etc., to facilitate rapid retrieval of the product by the employee.

If necessary, the employee may zoom out to see where the aisle is located in the overall establishment. The employee may therefore readily compare the content of the output image to the merchandise on the shelves and quickly orient himself upon arriving at the aisle in question. Accordingly, the product retrieval task may be completed efficiently and with minimal effort or frustration. Images from the handheld mobile devices 22 may also be used to update the image database 20.

Another usage scenario may involve a customer shopping assistance (e.g., "wayfinding") solution in which a customer inquires as to the location of a particular product in the retail area 10. In such a case, the query might be the name of a product or type of product (e.g., "rice"), wherein the illustrated inventory system 18 searches the image database 20 for the term "rice" and returns an image of the product location, along with additional information such as an aisle identifier, shelf identifier, floor plan, user specific workflow information, visual highlight, etc., to facilitate rapid retrieval of the product by the customer. Indeed, the additional information may indicate that the shelf location in question is empty and trigger a request to a store employee and/or manager to retrieve more of the product from the storeroom/stocking area.

Examples of user specific workflow input include, for example, a planned product location, user location, shopping preferences, analytics derived from establishment purchase history, etc. Indeed, augmenting the output image may include showing condition/compliance of items on the shelf, specific actions that need to be taken to resolve a specific shelf condition, and so forth.

Other usage scenarios, such as suggested shopping and/or stocking routes may also use the illustrated solution. For example, a customer may enter/download a shopping list as a query, wherein the illustrated inventory system 18 extracts the shopping list from the query and identifies a plurality of product identifiers (e.g., product names and/or categories) in the shopping list. The inventory system 18 may then determine an optimal/suggested shopping route based on the identified products, and return the suggested shopping route to the mobile device 22 along with shelf images of each product on the shopping list. Similarly, an employee may enter/download a stocking list as a query, wherein the inventory system 18 may extract the stocking list from the query and identify a plurality of product identifiers in the stocking list in order to generate a suggested stocking route. A wide variety of other usage scenarios may also take advantage of the techniques shown.

Figure 2A:
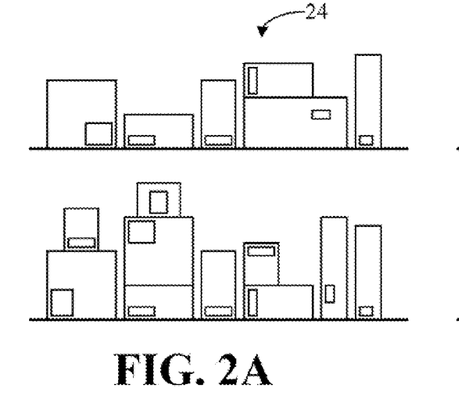
FIG. 2A is an illustration of an image of a product location according to an embodiment.
Figure 2B:
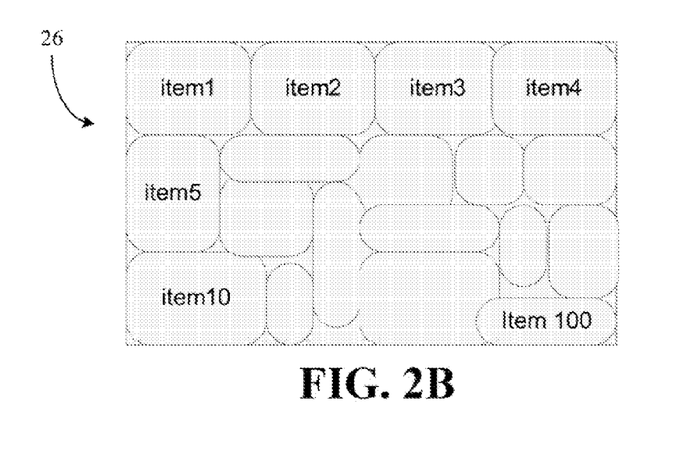
FIG. 2B is a block diagram of a product location layout according to an embodiment.
Figure 2C:
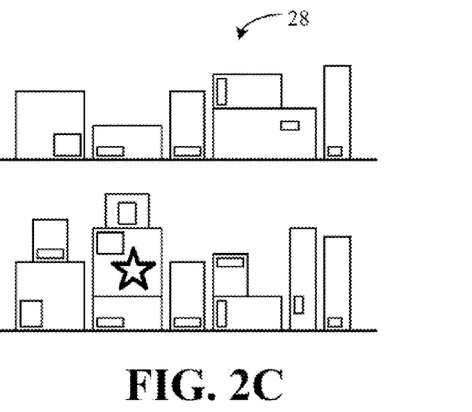
FIG. 2C is an illustration of an annotated image of a product location according to an embodiment.

FIGS. 2A-2C show one approach to processing inventory image data as described herein. In particular, FIG. 2A shows an interior establishment image 24 that may be taken by a surveying mobile platform such as, for example, the surveying mobile platform 22 (FIG. 1) in the stocking area 12 (FIG. 1), as already discussed. FIG. 2B shows a product location layout 26 that may be generated as a result of an image analysis that is conducted on the interior establishment image 24 by an inventory system such as, for example, the inventory system 18 (FIG. 1). The product location layout 26 may be used to populate an image database such as, for example, the aforementioned image database 20 (FIG. 1). FIG. 2C demonstrates that upon receiving a query related to one of the products in the interior establishment image, the inventory system may identify the interior establishment image in the image database, annotate the particular product location in the interior establishment image with a visual highlight (e.g., star), and return the annotated interior establishment image as an output image 28. In one example, the output image 28 is transmitted wirelessly to the handheld mobile device that originated the query, wherein the output image 28 may be reduced in resolution to reduce transmission bandwidth and speed transmission time.

Figure 3:
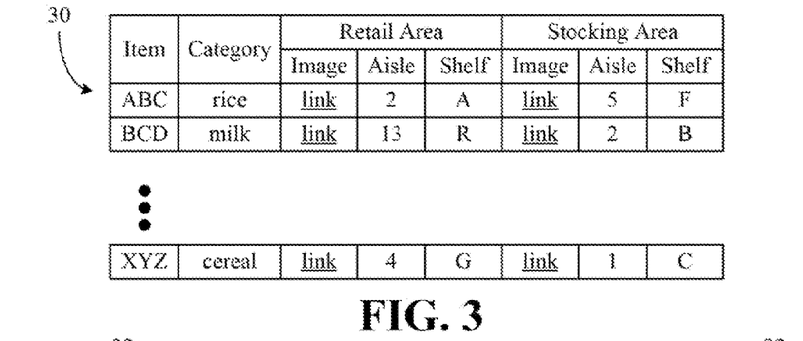
FIG. 3 is a block diagram of an example of an image database according to an embodiment.

Turning now to FIG. 3, one example of an image database 30 is shown. The image database 30, which may be readily substituted for the image database 20 (FIG. 1, may include a variety of fields to facilitate rapid searches and real-time results. Moreover, the image database 30 may also utilize other known structures such as relational database structures and/or linked lists to track, manage, control and organize the data represented therein. In the illustrated example, an item field is used as a product identifier, and may contain a barcode and/or UPC. Additionally, other parameters such as, for example, product category, image link, aisle identifier, shelf identifier, etc., may be used.

Figure 4:
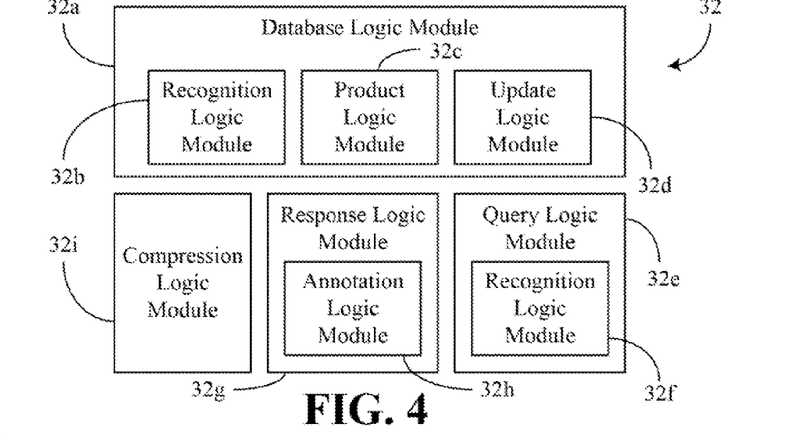
FIG. 4 is a block diagram of an example of a logic architecture according to an embodiment.

Turning now to FIG. 4, a logic architecture 32 (32a-32i) is shown, wherein the logic architecture 32 may be generally incorporated into an inventory device/system such as, for example, the inventory system 18 (FIG. 1). In the illustrated example, a database logic module 32a receives image data from a surveying mobile platform, and uses the image data to construct an image database. More particularly, the database logic module 32a may include a recognition logic module 32b that detects content such as barcodes, text, logos, and object shapes in the image data, wherein a product logic module 32c may identify a plurality of products based on the detected content. Moreover, an update logic module 32d may add the plurality of products and the image data to the image database.

The illustrated logic architecture 32 also includes a query logic module 32e that receives queries and retrieves output images from the image database in response to the queries. More particularly, the query logic module 32e may also include a recognition logic module 32f that is configured to identify content such as input images, shelf locations in the input images, product identifiers, aisle identifiers, and so forth, in the queries, wherein the output images are retrieved based on the identified content. Additionally, the recognition logic module 32f may be configured to extract shopping lists from the queries, wherein the product identifiers may be identified in the shopping lists.

A response logic module 32g may transmit the output images to the mobile devices originating the queries, wherein the output images may show shelf locations in a retail and/or stocking area of an establishment. The output images may therefore correspond to products associated with the queries. In one example, the response logic module 32g includes an annotation logic module 32h that annotates output images with visual highlights, aisle identifiers, floor plans, suggested shopping routes, and so forth.

The logic architecture 32 may also include a compression logic module 32i to enable greater control over transmission bandwidth and storage requirements. In particular, the illustrated compression logic module 32i identifies barcode-free regions in the image database and compresses image data corresponding to the barcode-free regions. Such an approach may improve storage efficiency. Moreover, the compression logic module 32i may compress output images prior to transmission of the output images to the mobile devices in order to improve bandwidth efficiency. The compression may involve reducing the resolution of the images, wherein the reduced resolution may be negligible from a barcode-free image searching and image display standpoint.

Figures 5, 6:
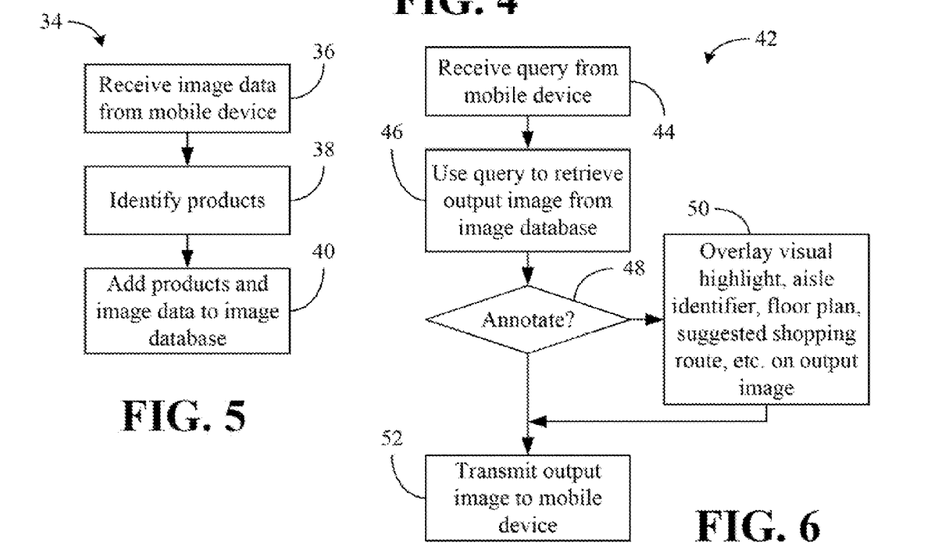
FIG. 5 is a flowchart of an example of a method of constructing an image database according to an embodiment.
FIG. 6 is a flowchart of an example of a method of responding to a query from a mobile device according to an embodiment.

Turning now to FIG. 5, a method 34 of constructing an image database is shown. The method 34 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 34 may be written in any combination of one or more programming languages, including an object oriented programming language such as C++ or the like and conventional procedural programming languages, such as the "C" programming language or similar programming languages. Moreover, the method 34 could be implemented as the logic architecture 32 (FIG. 4) using any of the aforementioned circuit technologies.

Illustrated processing block 36 provides for receiving a plurality of interior establishment images and/or stocking area images from a mobile device, wherein a plurality of products may be identified at block 38 based on the image data. In particular, block 38 may involve detecting content such as barcodes, text, logos, object shapes, and so forth, in the image data. Block 38 may also utilize supporting information such as aisle information, wheel movement measurements, establishment layout information, etc., to identify the products and associate them with specific locations in the establishment. Illustrated block 40 provides for adding the image data, the identified products and their respective establishment locations to the image database.

Of particular note is that multiple interior establishment and/or stocking area images may show a common shelf location under different conditions. For example, using images taken from multiple views/resolutions/times of a given shelf location may improve the object identification robustness in the given shelf location. Moreover, such an approach may convey the condition of objects in a way that is not possible to do with a single image. For example, images taken from multiple view points or under different lighting conditions may be used to detect items on the shelf that are occluded.

FIG. 6 shows a method 42 of responding to a query from a mobile device. The method 42 may be implemented as a set of logic instructions and/or firmware stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 44 provides for receiving a query from a mobile device, wherein the query may be used at block 46 to retrieve an output image from an image database. Block 46 may involve identifying content such as, for example, an input image, a product identifier and an aisle identifier, in the query. In one example, a product and/or a shelf location are also identified in the input image. Indeed, block 46 may also provide for extracting a shopping list from the query, wherein product identifiers are identified in the shopping list.

A determination may be made at block 48 as to whether the output image is to be annotated, wherein the determination at block 48 may be made based on the type of query received and/or the type of device issuing the query. For example, if the query is received from a customer mobile device and the query constitutes a request for the location of a type of product in the retail area, it may be determined that a visual highlight and aisle identifier are to be added to the output image. Similarly, if the query is received from an employee mobile device and the query constitutes a request for the location of a particular product in the stocking area, it may also be determined that a visual highlight and aisle identifier are to be added to the output image. If, on the other hand, the query merely constitutes an inventory tracking message, it might be determined that annotation is not required. Illustrated block 50 provides for overlaying or otherwise annotating the output image with the appropriate visual highlight, aisle identifier, floor plan, user specific workflow, suggested route, etc., wherein the output image may be transmitted to the mobile device that originated the query at block 52.

Indeed, multiple output images of the same shelf location may be retrieved from the image database and transmitted to the handheld device, wherein the output images might be used to show the shelf location over time. A visual interface may therefore be provided in which spatial/temporal information of the shelf is revealed using images collected at various times and across the establishment. Such a visual interface may be used to identify new conditions and events pertaining to shelved inventory, when a human operator looks at them, in a way that may not have been understood before. For example, shelf compliance issue over time may be correlated with sales drop for a particular item.

Figure 7:
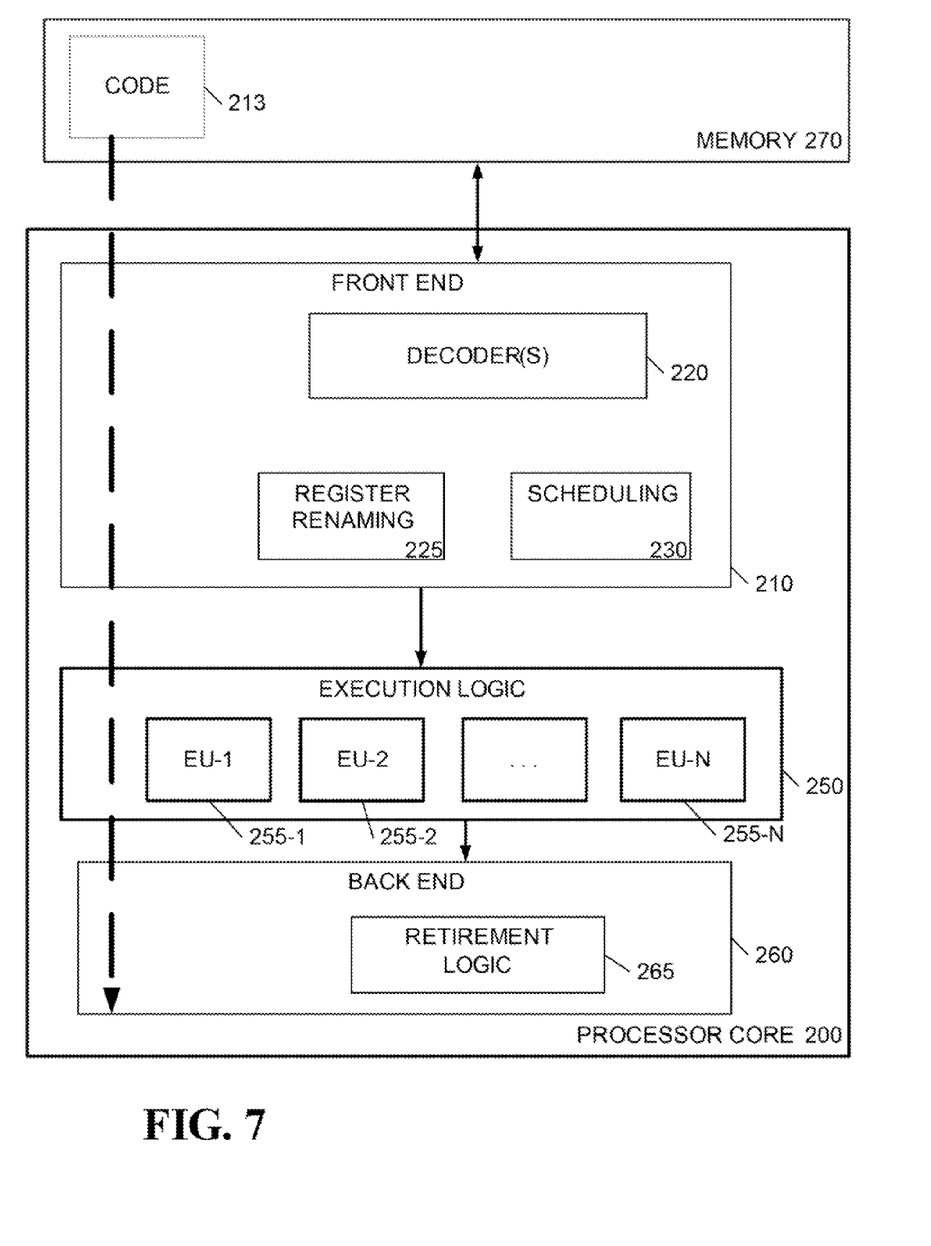
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 32 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
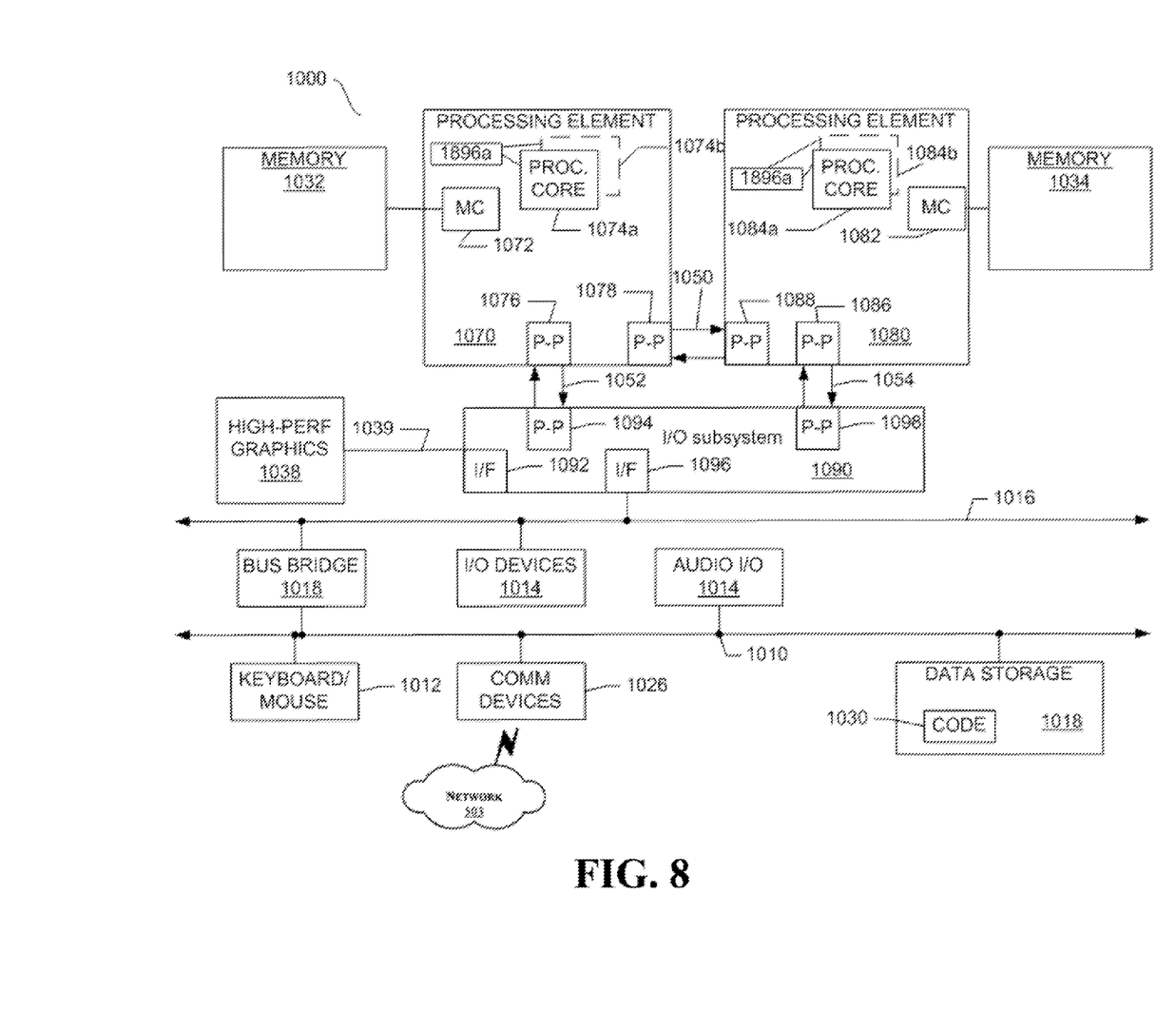
FIG. 8 is a block diagram of an example of a system according to an embodiment.

Referring now to FIG. 8, shown is a block diagram of a system embodiment 1000 in accordance with an embodiment of the present invention. Shown in FIG. 8 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 7.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 8, various I/O devices 1014 may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, not shown), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 32 (FIG. 4) and could be similar to the code 213 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Examples may include an apparatus having a query logic module to receive a product query regarding an establishment and retrieve an output image from an image database in response to the product query. The apparatus may also have a response logic module to transmit the image to a mobile device.

Additionally, the apparatus may further include a database logic module to receive a plurality of interior establishment images and use the plurality of interior establishment images to construct the image database.

Moreover, the database logic module may receive a plurality of stocking area images and use the plurality of stocking area images to further construct the image database.

In addition, the database logic module may include a first recognition logic module to detect first content including one or more of barcodes, text, logos, and object shapes in the plurality of interior establishment images and the plurality of stocking area images, a product logic module to identify a plurality of products based on the first content, and an update logic module to add the plurality of products, the plurality of interior establishment images, and the plurality of stocking area images to the image database.

In addition, the query logic module may include a second recognition logic module to identify second content including one or more of an input image, a product identifier, and an aisle identifier in the query, wherein the output image is to be retrieved based on the second content.

Moreover, the second recognition logic module may identify third content including one or more of a product and a shelf location in the input image, wherein the output image is to be retrieved further based on the third content.

Additionally, the second recognition logic module may extract a shopping list from the query, wherein the product identifier is to be identified in the shopping list.

Additionally, the output image may show a shelf location corresponding to a product associated with the query.

Moreover, the shelf location may be in one or more of the establishment and a stocking area associated with the establishment.

In addition, the response logic module may include an annotation logic module to annotate the output image with one or more of a visual highlight, an aisle indicator, a floor plan, user specific workflow information, and a suggested route.

In addition, the apparatus may further include a compression logic module to identify one or more barcode-free regions in the image database, compress image data corresponding to the one or more barcode-free regions, and compress the output image prior to transmission of the output image to the mobile device.

Moreover, the response logic module of any one of the aforementioned apparatus examples may transmit the output image to a handheld device.

Examples may also include a system having a handheld device to issue a product query regarding an establishment containing a plurality of products, and an inventory device. The inventory device may include a query logic module to receive the product query and retrieve an output image from an image database in response to the product query. Additionally, the inventory device may include a response logic module to transmit the output image to the handheld device.

Moreover, the inventory device can further include a database logic module to receive a plurality of interior establishment images and use the plurality of interior establishment images to construct the image database.

Examples may also include a method in which a product query regarding an establishment is received. The method may also provide for retrieving an output image from an image database in response to the query, and transmitting the output image to a mobile device.

Moreover, the method may further include receiving a plurality of interior establishment images, and using the plurality of interior establishment images to construct the image database.

Additionally, the method may further provide for receiving a plurality of stocking area images, and using the plurality of stocking area images to further construct the image database.

Additionally, the method may further involve detecting first content including one or more of barcodes, text, logos, and object shapes in the plurality of interior establishment images and the plurality of stocking area images, identifying a plurality of products based on the first content, and adding the plurality of products, the plurality of interior establishment images, and the plurality of stocking area images to the image database.

Moreover, at least two of the plurality of interior establishment images of the method may show a common shelf location under different conditions, wherein the different conditions may be one or more of views, resolutions, and times.

Moreover, the method may further include identifying second content including one or more of an input image, a product identifier, and an aisle identifier in the query, wherein the output image is retrieved based on the second content.

In addition, the method may further provide for identifying third content including one or more of a product and al shelf location in the input image, wherein the output image is retrieved further based on the third content.

In addition, the method may further involve extracting a list from the query, wherein the product identifier is identified in the shopping list, and wherein the list is one of a shopping list and a stocking list.

Moreover, the output image retrieved by the method may show a shelf location corresponding to a product associated with the query.

Additionally, the shelf location shown in the output image retrieved by the method may be in one or more of the establishment and a stocking area associated with the establishment.

In addition, the method may involve retrieving a plurality of output images from the image database in response to the product query, and transmitting the plurality of output images to the handheld device, wherein the plurality of output images show the shelf location over time.

Additionally, the method may further provide for annotating the output image with one or more of a visual highlight, an aisle identifier, a floor plan, user specific workflow information, and a suggested route.

Moreover, the method may further include identifying one or more barcode-free regions in the image database, compressing image data corresponding to the one or more barcode-free regions, and compressing the output image prior to transmission of the output image to the mobile device.

Examples may also include at least one computer-readable medium having one or more instructions that when executed on a processor configure the processor to perform any one of the aforementioned method examples.

Examples may also include an inventory device having a database logic module to receive image data from a first mobile device, wherein the image data is to include a plurality of interior establishment images and a plurality of stocking area images associated with a retail establishment, and use the image data to construct an image database, the database logic module having a first recognition logic module to detect first content including one or more of barcodes, text, logos, and object shapes in the image data, a product logic module to identify a plurality of products based on the first content, and an update logic module to add the plurality of products and the image data to the image database. The inventory device may also include a query logic module to receive a query regarding the retail establishment from a second mobile device, and retrieve an output image from the image database in response to the query, the query logic module including a second recognition logic module to identify second content including one or more of a product in an input image, a shelf location in the input image, a product identifier, and an aisle identifier in the query, wherein the output image is to be retrieved based on the second content. Additionally, the inventory device may include a response logic module to transmit the output image to the second mobile device, wherein the output image is to show a shelf location in one or more of the retail establishment and a stocking area associated with the retail establishment, and wherein the shelf location shown in the output image is to correspond to a product associated with the query.

In addition, the second recognition logic module may extract a shopping list from the query, wherein the product identifier is to be identified in the shopping list.

Moreover, the response logic module may include an annotation logic module to annotate the output image with one or more of a visual highlight, an aisle identifier, a floor plan, user specific workflow information, and a suggested route.

Additionally, any one of the aforementioned system examples may further include a compression logic module to identify one or more barcode-free regions in the image database, compress image data corresponding to the one or more barcode-free regions, and compress the output image prior to transmission of the output image to the second mobile device.

Techniques described herein may therefore provide an image-based approach that dramatically improves operational efficiencies of large retailers. For example, a virtual representation of a business location (e.g., retail, wholesale, warehouse) may be constructed by "stitching" together multiple high-resolution images acquired by a specialized hardware device. The images thus collected may be processed by a back-end service that enhances the establishment's inventory management system by identifying products, image recognition and/or by scanning barcodes affixed to products or shelves. Localized updates to the image and inventory database may also be made by merging images acquired from less-expensive, lower-resolution cameras of handheld devices carried by stock and sales associates.

Furthermore, the same technology (e.g., mobile platform or handheld device) that is used to scan items in the retail space may also be used to scan and register inventory in back-room stocking areas. Once the identification of each item and its location in the image database has been determined, this information may be correlated and cataloged to facilitate more efficient shopping and inventory management. The time savings provided by this technology may enable establishments to hire fewer sales associates and/or provide superior customer service. Potential applications include, but are not limited to, retailers, nurseries, governmental entities such as the military or other agencies that process and store inventories of supplies, information technology (IT) companies, and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A non-transitory computer readable storage medium comprising a set of instructions which, when executed by a processor, cause a computer to:
   receive image data from a first mobile device, wherein the image data is to include a plurality of interior establishment images and a plurality of stocking area images associated with a retail establishment, and use the image data to construct an image database, and wherein the image data is used to detect first content including one or more of barcodes, text, logos, and object shapes in the image data, identify a plurality of products based on the first content, and add the plurality of products and the image data to the image database;
   receive a query regarding the retail establishment from a second mobile device, and retrieve an output image from the image database in response to the query, wherein the output image is used to identify second content including one or more of a product in an input image, a shelf location in the input image, a product identifier, and an aisle identifier in the query, wherein the output image is to be retrieved based on the second content; and
   transmit the output image to the second mobile device, wherein the output image is to show a shelf location in one or more of the retail establishment and a stocking area associated with the retail establishment, and wherein the shelf location shown in the output image is to correspond to a product associated with the query.

2. The medium of claim 1, wherein the instructions, when executed, further cause a computer to: extract a list from the query, and wherein the product identifier is to be identified in the list, and wherein the list is to be one of a shopping list and a stocking list.

3. The medium of claim 1, wherein the instructions, when executed, further cause a computer to: annotate the output image with one or more of a visual highlight, an aisle identifier, a floor plan, user specific workflow information, and a suggested route.

4. The medium of claim 1, wherein the instructions, when executed, further cause a computer to: identify one or more barcode-free regions in the image database, compress image data corresponding to the one or more barcode-free regions, and compress the output image prior to transmission of the output image to the second mobile device.

* * * * *